US012748241B2

(12) United States Patent
Bennett et al.

(10) Patent No.: US 12,748,241 B2
(45) Date of Patent: Sep. 29, 2026

(54) DIAMOND LENS

(71) Applicant: Element Six Technologies Limited, Didcot (GB)

(72) Inventors: Andrew Michael Bennett, Didcot (GB); Frederick Richard Faulkner, Didcot (GB)

(73) Assignee: Element Six Technologies Limited, Didcot (GB)

( * ) Notice: Subject to any disclaimer, the term of this patent is extended or adjusted under 35 U.S.C. 154(b) by 792 days.

(21) Appl. No.: 17/758,347

(22) PCT Filed: Feb. 3, 2021

(86) PCT No.: PCT/EP2021/052547
§ 371 (c)(1),
(2) Date: Jul. 1, 2022

(87) PCT Pub. No.: WO2021/156309
PCT Pub. Date: Aug. 12, 2021

(65) Prior Publication Data
US 2023/0067863 A1 Mar. 2, 2023

(30) Foreign Application Priority Data
Feb. 5, 2020 (GB) ..................................... 2001553

(51) Int. Cl.
*G02B 1/02* (2006.01)
*G02B 3/08* (2006.01)

(52) U.S. Cl.
CPC *G02B 1/02* (2013.01); *G02B 3/08* (2013.01)

(58) Field of Classification Search
None
See application file for complete search history.

(56) References Cited

U.S. PATENT DOCUMENTS 7,964,280 B2 * 6/2011 Williams ................ C30B 25/02 428/408
2010/0015438 A1 1/2010 Williams et al.

FOREIGN PATENT DOCUMENTS

EP 0718642 A1 6/1996

OTHER PUBLICATIONS

United Kingdom Patent Application No. GB2001553.3, Combined Search and Examination Report dated Nov. 12, 2020, 12 pages.
United Kingdom Patent Application No. GB2101489.9, Combined Search and Examination Report dated Jul. 14, 2021, 7 pages.
International Patent Application No. PCT/EP2021/052547, International Search Report dated Mar. 10, 2021, 16 pages.
(Continued)

*Primary Examiner* — Phu Vu
(74) *Attorney, Agent, or Firm* — Kilpatrick Townsend & Stockton LLP

(57) ABSTRACT

A diamond lens (3) configured for use in a multispectral imaging system (1). The diamond lens (3) has a largest linear dimension of at least 10 mm and is formed from diamond material having a birefringence An of greater than $1\times10^{-4}$, measured over a specified area of at least 4 mm by 4 mm through a maximum thickness of at least 400 μm. A multispectral imaging system (1) comprising the diamond lens (3) and a component (2) comprising the diamond lens are also described.

9 Claims, 6 Drawing Sheets

(56) References Cited

OTHER PUBLICATIONS

Thompson, "Common aperture multispectral optics for military applications," Advances in Resist Technology and Processing XVI, Apr. 23, 2012, vol. 8353, pp. 83531X-1-83531X-13, SPIE.
Collins, "The colour of diamond and how it may be changed," Journal of Gemmology, 2001, vol. 27, No. 6, pp. 341-359, Gemmological Association of Gem Testing Laboratory of Great Britain.
Glazer et al., "An Automatic Optical Imaging System for Birefringent Media," Proceedings: Mathematical, Physical and Engineering Sciences, Dec. 8, 1996, vol. 452, No. 1955, pp. 2751-2765, The Royal Society.
Dodson et al., "Single crystal and polycrystalline CVD diamond for demanding optical applications," Proceedings of SPIE: Window and Dome Technologies and Materials XII, 2011, vol. 8016, pp. 80160L-1-80160L-11, SPIE.
Schreck et al., "Large-area high-quality single crystal diamond," MRS Bulletin, 2014, vol. 39, pp. 504-510, Materiels Research Society.
Mengu et al. "Snapshot multispectral imaging using a diffractive optical network". Light: Science & Applications, vol. 12, No. 1, Apr. 6, 2023, 20 pages.

* cited by examiner

DIAMOND LENS

BACKGROUND

The invention relates to diamond lenses, in particular diamond lenses for multispectral imaging systems, and the multispectral imaging systems that include such diamond lenses.

INTRODUCTION

Synthetic diamond materials grown by CVD have been established as critical components in many state of the art optical applications. These components include windows for high power lasers, prisms for ATR spectroscopy, $CO_2$ laser exit windows, and in-cavity heat spreaders for disc lasers.

Due to absorption and scatter, electromagnetic radiation travelling through the atmosphere is limited to several distinct wavebands, each containing different information. Typically, as most optical systems are designed to operate in a single waveband, multiple systems are combined to obtain all available data.

Image fusion is the process of combining relevant information from two or more images into a single image. It is possible to overlay imagery from multiple wavebands using image fusion to provide increased awareness of what is present in the scene. An example of this is the highlighting of potentially hidden thermal signatures by overlaying the long wave infrared (LWIR) scene onto a near infrared (NIR) or short wave infrared (SWIR) scene.

A common way to achieve image fusion is by optical fusion or digital fusion of the outputs from separate aperture devices. Optical fusion requires additional beam integration optics to overlay the separate waveband imagery into a visible channel, and digital fusion takes the output from separate digital sensors and overlays the imagery digitally before displaying. The three key disadvantages to separate aperture systems are size, weight and parallax. Size and weight are a result of multiple imaging apertures and possibly multiple sensor arrangements and integration optics, whilst parallax will always be present in multiple aperture systems and limits confidence in the fused image.

To reduce the effect of these three problems, one method is to use an optical system that focuses all of the wavelengths of interest onto a single detector capable of operating in multiple wavebands. Recently there has been an increase in interest for such detector technologies in agriculture, space, defence, medical and printing applications. Thompson, N. A., "Common aperture multispectral optics for military applications," Proc. SPIE 8353, (2012) discusses multispectral imaging optics and compares different materials. Diamond is suggested as a material that is suitable as it is transmissive in both the SWIR and LWIR. However, a problem with diamond is that it is difficult to produce single crystal diamond that has both a large enough area to be used as a lens for multispectral imaging and has sufficient optical quality to allow confidence in obtained multispectral images.

Chemical Vapour Deposition (CVD) is a well-known technique to make diamond with excellent optical properties. Both polycrystalline diamond and single crystal diamond can be made using this technique. Polycrystalline diamond can be grown over areas sufficient for use in lenses in typical optical imaging systems (10-30 mm), however it is often limited in optical applications in the light path for wavelengths below 10 μm due to increasing absorption, scatter and birefringence. Single crystal CVD diamond has better optical properties, particularly in terms of absorption, birefringence and scatter, than polycrystalline CVD diamond. However, techniques to grow large area single crystal CVD diamond beyond around 8 mm in size, including growing on a plurality of tiled substrates or using heteroepitaxial growth typically lead to single crystal diamonds with a far greater density of defects than single crystal diamond. Defects include both point defects that contribute to absorption, and threaded defects. This places limitations on the size of single crystal diamond with excellent optical properties that can be obtained.

Better optical properties would be expected to be critical in imaging applications. Higher levels of absorption will decrease the light getting to the sensor and reduce the brightness of any image. Birefringence can affect the overall optical performance of a system if there are any polarisation sensitive components, whilst scatter will reduce the image sharpness that can be achieved. Not only is there an issue around average levels of these properties being high, but there are also issues to be expected in high levels of inhomogeneity that would be expected in polycrystalline diamond and in tiled and heteroepitaxial single crystal.

These issues are greater for multi-spectral applications, where variations in these properties across wavelengths make corrections more challenging.

SUMMARY

It is an object of the invention to provide a diamond lens with a sufficiently large area and adequate optical properties for use in multispectral imaging.

According to a first aspect, there is provided a diamond lens configured for use in a multispectral imaging system, the diamond lens having a largest linear dimension of at least 10 mm and formed from diamond material having a birefringence $\Delta n$ of greater than $1\times10^{-4}$, measured over a specified area of at least 4 mm by 4 mm through a maximum thickness of at least 400 μm. It is surprising that such a large lens with a relatively high birefringence is usable in this application.

As an option, the diamond lens comprises single crystal diamond material. This is optionally single crystal diamond material obtained by one of a tiling growth method and a heteroepitaxial growth method. Such material optionally has a FWHM X-ray rocking curve width for the (004) reflection of greater than 20 arc seconds.

As an alternative option, the diamond lens comprises polycrystalline diamond material.

The diamond lens optionally has at least one curved surface, the curved surface having a surface roughness Ra selected from any of no more than 3 nm, no more than 5 nm, no more than 10 nm, and no more than 20 nm.

The diamond lens optionally has at least one substantially flat surface, the flat surface having a surface roughness Ra selected from any of no more than 3 nm, no more than 5 nm, no more than 10 nm, and no more than 20 nm.

The diamond lens is optionally provided with any of a surface coating and a surface structure to deliver improved optical properties.

As an option, the forward scatter of the diamond lens at a wavelength of 1.064 μm measured in a sample of the specified thickness and area, integrated over a solid angle from 2.5° to 30° from the transmitted beam, is between 0.5% and 3%.

The absorption coefficient of the diamond material at a wavelength of 1.064 μm is optionally greater than 0.01 $cm^{-1}$.

The diamond lens optionally substantially partially spherical or partially ellipsoidal in shape.

As an alternative option, the diamond lens is a Fresnel lens

According to a second aspect, there is provided a multi-spectral imaging system comprising the diamond lens described above in the first aspect.

According to a third aspect, there is provided a component for a multispectral imaging system, the component comprising at least one diamond lens as described above in the first aspect.

According to a fourth aspect, there is provided a diamond lens configured for use in a multispectral imaging system, the diamond lens having a largest linear dimension of at least 10 mm and formed from single crystal diamond material having FWHM X-ray rocking curve width for the (004) reflection of greater than 20 arc seconds.

BRIEF DESCRIPTION OF THE DRAWINGS

The present invention will now be described further by reference to the following figures and examples, which are in no way limiting on the scope of the claims.

DETAILED DESCRIPTION

A number of material properties are critical to the selection of the optimum material to be used as the lens in a multi-spectral system. A broad transmission spectrum is necessary for the system to operate in multiple regions of the electromagnetic spectrum. Low dispersion reduces the need for colour correction between different wavebands. Materials with a low coefficient of thermal expansion will reduce the impact of athermalisation effects and material resilience will allow the system to operate in harsh environments. The optical properties of diamond are well-known. The following is a discussion of those properties that are of particular interest to multi-spectral imaging.

Figure 1:
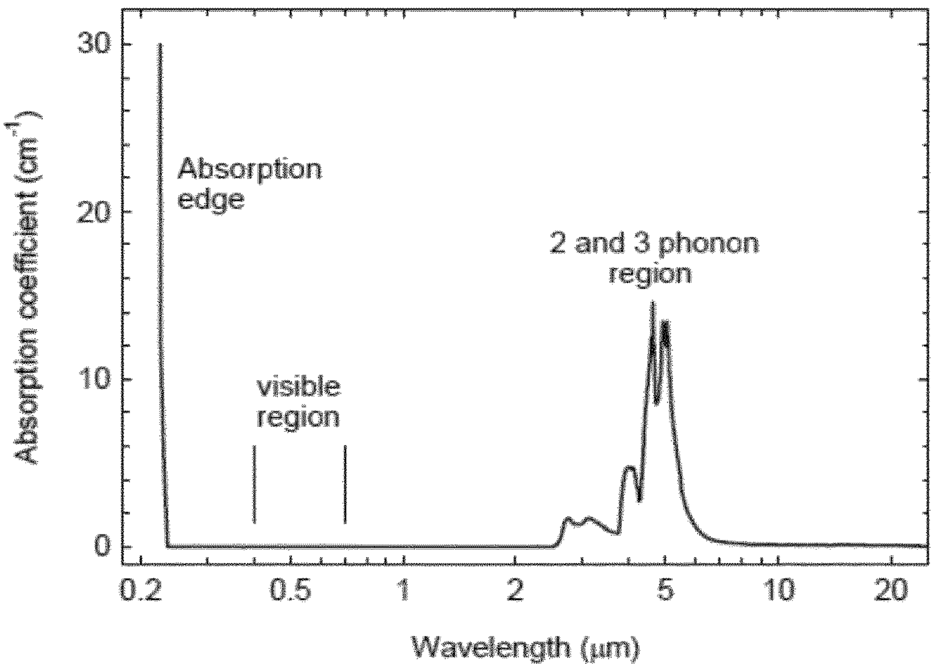
FIG. 1 is a graph of the absorption spectrum of high purity single crystal diamond in the UV to mid-IR range, reproduced from Collins, A. T., Journal of Gemmology 27(6), 341-359 (2001)

Wide spectral transparency is observed in diamond extending to 500 μm except for regions of intrinsic multi-phonon related absorption in the infrared (2.5-6.5 μm) and below the bandgap at around 226 nm. The absorption coefficient for intrinsic diamond from the UV to long wavelength IR is illustrated in FIG. 1. Calorimetric absorption values at 1064 nm are as low as 0.003 $cm^{-1}$ for single crystal CVD diamond, while the absorption coefficient at 10.6 μm was found to be 0.02-0.05 $cm^{-1}$ for both single and polycrystalline samples.

Another property of interest for the multi-spectral imaging application is the refractive index and how this varies with both wavelength and temperature. Diamond has a refractive index in the range of 2.7 (at 220 nm) to 2.37 (at 10.6 μm). The refractive index n(λ) of light can be modelled based on experimental results according to Equation 1.

$$n^2(\lambda) = 1 + \frac{4.658\lambda^2}{\lambda^2 - (112.5\text{ nm})^2} \quad \text{(Eq. 1)}$$

Figure 2:
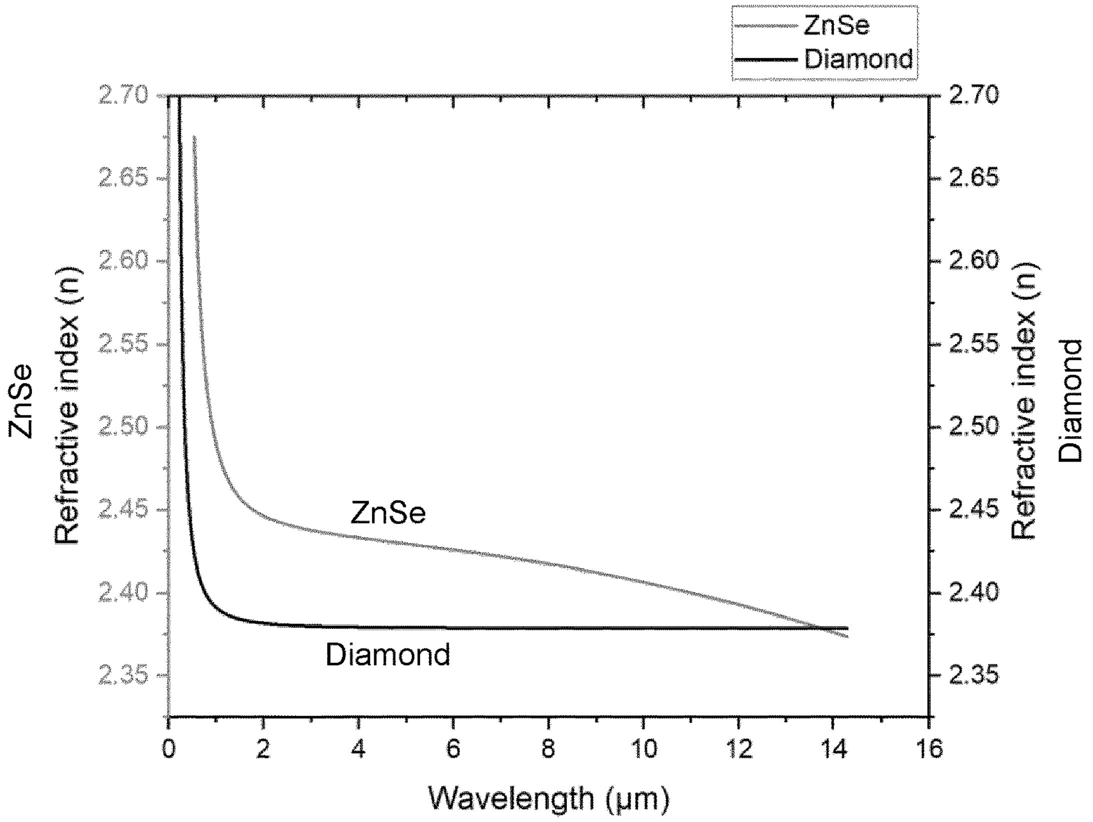
FIG. 2 is a graph showing the refractive index of diamond and ZnSe plotted as a function of wavelength.
Figure 3A:
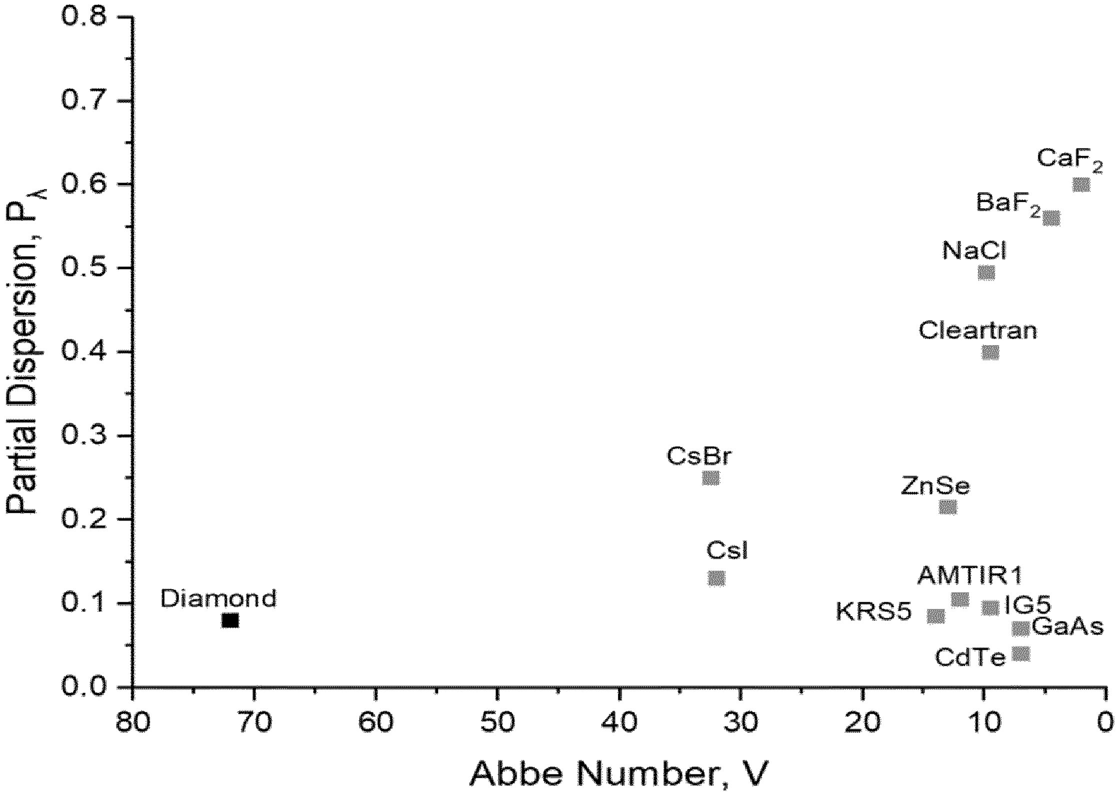
FIGS. 3*a* and 3*b* are partial dispersion plots for a) LW (8.0 to 12.0 μm) b) SW (0.9 to 1.7 μm), reproduced from Thompson, N. A., "Common aperture multispectral optics for military applications," Proc. SPIE 8353, (2012)
Figure 3B:
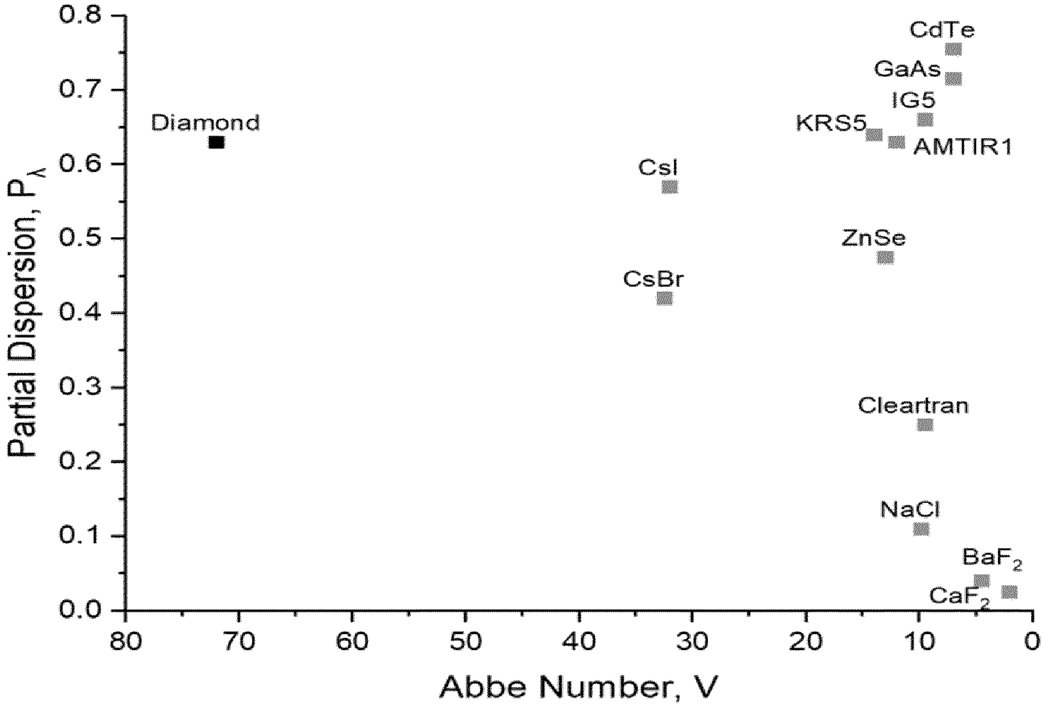

This equation is used to produce the plot of diamond's refractive index in FIG. 2. ZnSe is used as a comparison in this plot because it is a commonly used multi-spectral imaging material. Over the range of wavelengths commonly used in IR multi-spectral imaging (1064 nm to 10.6 μm), diamond's refractive index varies by −0.01 (0.5%) where the refractive index of ZnSe varies by −0.08 (3.3%). Changes in refractive index as a function of wavelength cause dispersion of light and lead to chromatic aberration if the material is used as a lens, so a material with a small change in refractive index within the operating wavelengths of the lens is desirable for the multi-spectral imaging application. Diamond and ZnSe are compared again in FIGS. 3, 4 and 5 with other optical materials included in FIGS. 3 and 5. Diamond has a refractive index in the range of 2.42, at 540 nm, to 2.38 at 10.6 μm compared to 2.68 and 2.40 respectively for ZnSe, so diamond causes less chromatic aberration when used as a lens.

Refractive index plays a key part in defining some of the figures of merit commonly used to select materials for multi-spectral imaging. The multi-spectral Abbe number, V, is defined using the two extreme wavelengths ($\lambda_{min}$ and $\lambda_{max}$—0.9 μm and 12.0 μm respectively in the case used for FIG. 3) and the refractive index of the material at these wavelengths ($n_{\lambda,min}$ and $n_{\lambda,max}$). The central wavelength $\Delta_{mid}$, is taken to be the defining wavelength of the material and in this case is taken as the harmonic mean of the wavelengths between the wavebands of interest (2.8 μm).

$$V = \left(\frac{n_{\lambda,mid} - 1}{n_{\lambda,min} - n_{\lambda,max}}\right) \quad \text{(Eq. 2)}$$

The partial dispersion $P_\lambda$, of the material is used to evaluate the colour correction of a system and is defined from $\lambda_{min}$. So $P_\lambda$ is the partial dispersion between the wavelengths $\lambda_{min}$ and λ.

$$P_\lambda = \left(\frac{n_{\lambda,min} - n_\lambda}{n_{\lambda,min} - n_{\lambda,max}}\right) \quad \text{(Eq. 3)}$$

These two values are used to match materials for multi-element solutions with the aim of bringing $\lambda_{min}$ and $\lambda_{max}$ to a common focus. Good combinations will give large differences in V while having small differences in $P_\lambda$ for two element solutions. Diamond is the most useful material shown in FIG. 3, having a very large V-value as well as having a good match in terms of partial dispersion to several materials.

Diamond's excellent thermal and mechanical properties enable diamond lenses to outperform other multi-spectral materials under harsh conditions. These conditions include temperatures ranging by 50 K and this means athermalisation and thermal defocus must be considered when choosing materials. For this reason, plots of thermal expansion coefficient and refractive index with temperature are considered in FIGS. 4 and 5. A small thermal expansion coefficient means that diamond will not be exposed to loss of structural integrity with temperature extremes and thermal defocus caused by a change in lens dimensions will be minimal. A small change in refractive index over the temperature range displayed in FIG. 4 indicates V and $P_\lambda$ will also show a small change compared to ZnSe.

Figure 4:
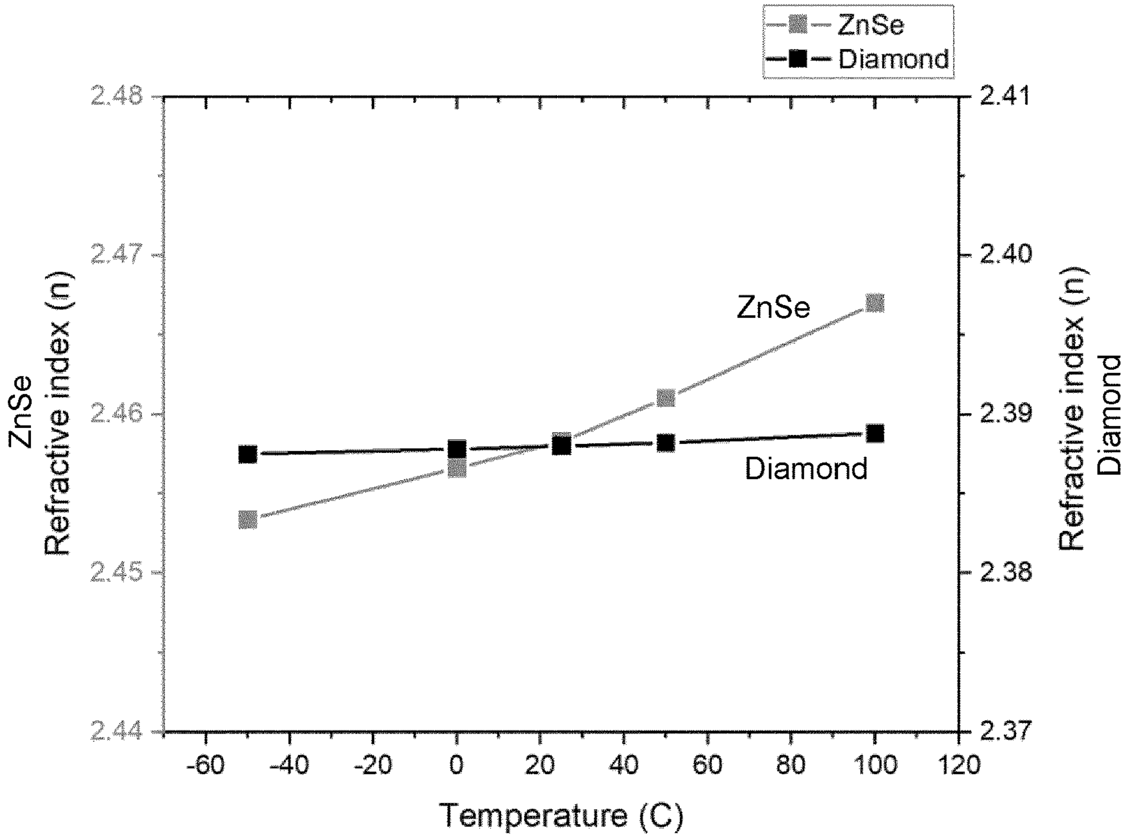
FIG. 4 is a graph showing the refractive index of diamond and ZnSe as a function of temperature.
Figure 5:
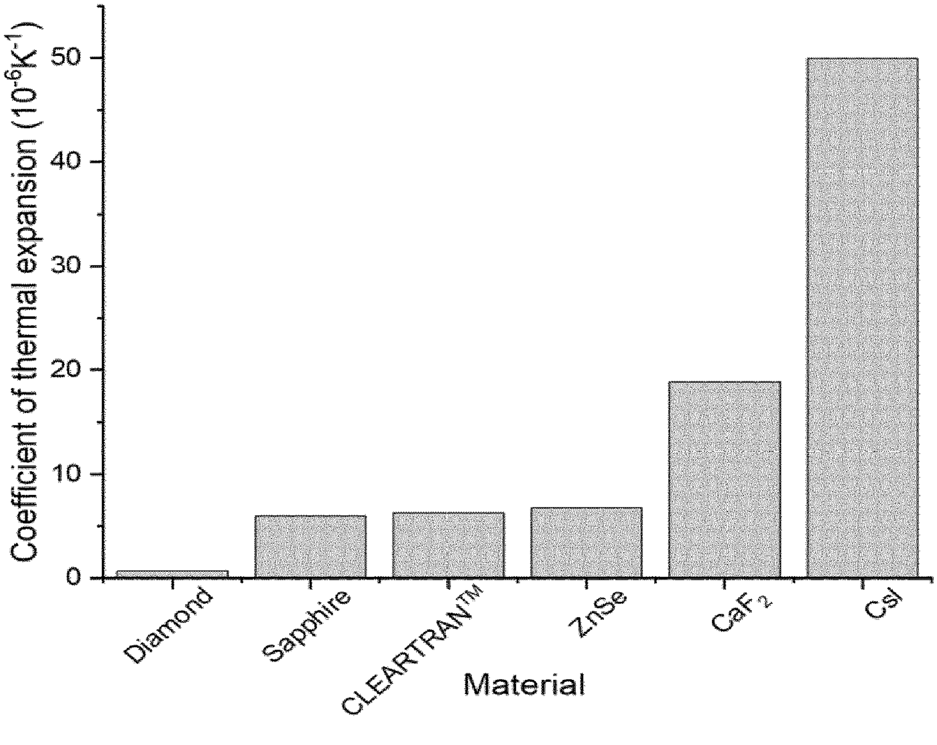
FIG. 5 is a graph showing the coefficient of thermal expansion (CTE) for multi-spectral materials.

FIG. 4 shows the refractive index of diamond and ZnSe as a function of temperature.

The thermo-optic coefficient of refractive index (1/n)×(dr/dT) of diamond is 3.2-6.7×$10^{-6}$ $K^{-1}$ in the IR region and is 2.0-4.0×$10^{-6}$ $K^{-1}$ in the UV to NIR region.

Developments in diamond processing techniques over the last ten years have opened up a number of optical applications by achieving material with very low roughness and high flatness. However, multi-spectral imaging typically requires a diamond lens, but due to diamond's hardness, this is a challenging target.

Figure 6A:
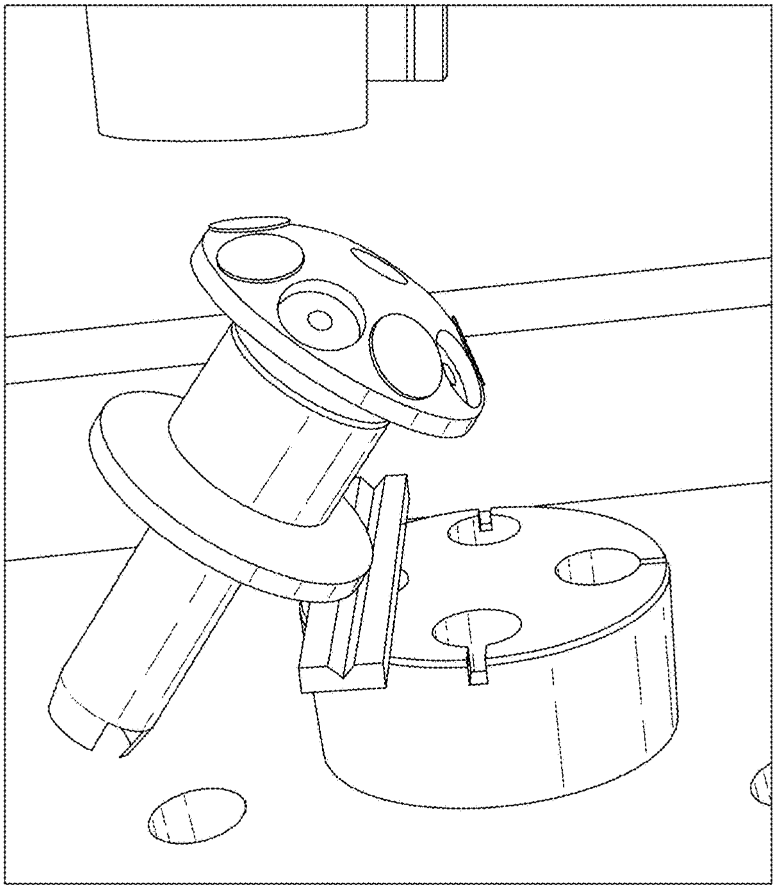
FIG. 6*a* is a polishing system designed produce a radius of curvature of 30 mm.

To make a diamond lens, a two-step approach has been applied, starting from a flat diamond blank. The first step was a rough laser ablation process that is used to achieve the desired curvature. For convex curvature, this generally involves mounting flat blanks to a spherical surface, positioning a cutting laser tangential to the spherical surface, and rotating the spherical surface, as shown in the apparatus of FIG. 6*a*. Initial prototype parts were processed using a pulsed Nd:YAG Rofin laser with a beam power of 10 W and the parts rotating at 50 rpm. For concave curvature, a top-down laser ablation process must be used. The second step is to polish the rough cut lenses using spherical polishing cups that are covered by diamond grit in a resin bonded matrix. A polishing system was custom designed to achieve the desired radius of curvature and roughness during the polishing step.

Figure 6B:
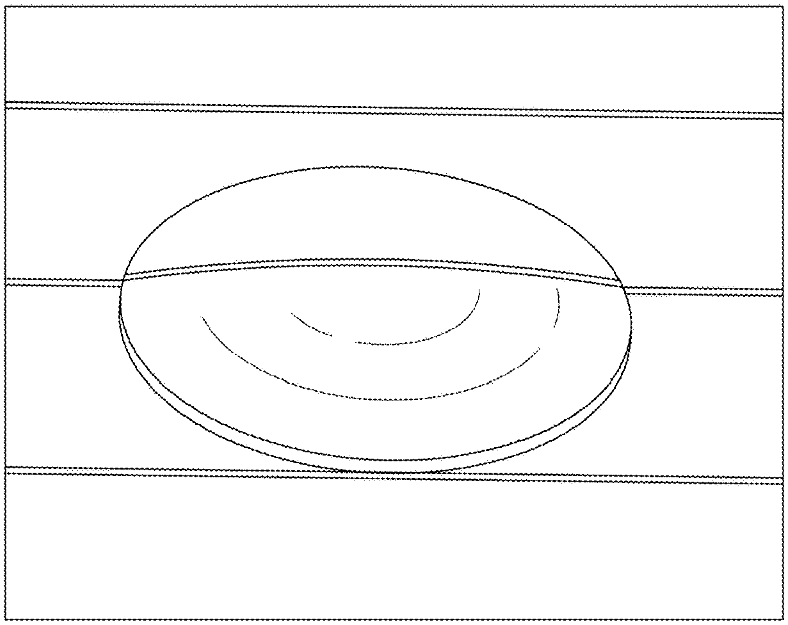
FIG. 6*b* is a polished polycrystalline diamond part after removal from the polishing system.

By way of example, a polycrystalline diamond lens of 9 mm diameter, 30 mm radius of curvature and 1 mm thickness was targeted. This lens was successfully processed with a roughness (Ra) less than 30 nm on the curved side. The apparatus for preparing this example, and an image of this example are shown in FIG. 6.

Optical grade polycrystalline diamond has been used to produce lenses for multi-spectral imaging. There are a number of multi-spectral imaging applications, including imaging in the NIR and visible wavelengths, where single crystal diamond lenses provide added benefit. Some advantages of single crystal over polycrystalline diamond include: a lower absorption coefficient, especially at NIR wavelengths—the absorption coefficient of polycrystalline diamond at 1064 nm is ~0.12 $cm^{-1}$ compared to less than 0.005 $cm^{-1}$ for optical grade single crystal; and lower scattered power –2.5% in optical grade polycrystalline diamond at 1064 nm compared to less than 0.7% in single crystal diamond (scatter angle greater than 2.50). Surface roughness (Ra) values of less than 2 nm in single crystal diamond have been achieved.

A potential disadvantage of optical grade polycrystalline diamond in multi-spectral imaging applications is the lack of birefringence control and high scatter resulting from the grain boundaries. The random nature of grain orientation and low control over inter- and intra-granular stress build-up during both production and use, give a distribution of refractive indices in the direction of growth and little control over polarisation of external light from the part. It is possible to partially solve this problem using CVD single crystal diamond, eliminating multiple grain orientations and any inter-granular stresses associated with that. The remaining birefringence in CVD single crystal diamond is typically due to dislocations that propagate from the seed crystal into the bulk of the diamond during synthesis.

As mentioned above, a prohibiting factor in the use of single crystal has been the size of SC with the maximum diameter available being around 8 mm. There has been growing interest to produce larger and larger single crystal parts and as a consequence there is likely to be the opportunity to use single crystal diamond as a lens.

Two potential routes to accessing large-area, high-quality single crystal diamond are heteroepitaxial deposition on large-area single crystals of a foreign material, and tiling of single crystal diamond substrates followed by homoepitaxial growth. Tiling single crystal substrates to create a larger 'mosaic' substrate has been used to synthesise diamond plates of 30×30 mm area. Currently, bias enhanced nucleation is the most efficient process to achieve epitaxial nucleation of diamond on substrates such as Ir to reliably produce samples of 20×20 mm in area.

A problem with the heteroepitaxial and tiling routes is that the resulting single crystal has lower 'perfection' than homoepitaxial diamond grown on a single substrate. Such crystals will typically have a much higher extended defect density and other defects. A measure of the crystalline perfection can be made using X-ray rocking curve measurement, as is known in the art.

A perfect single crystal, that is a crystal containing no impurity atoms, vacancies, interstitial atoms or extended defects (such as dislocations or stacking faults), would have a measured rocking curve width that is determined by the theoretical width (the 'Darwin Width'), the amount of elastic curvature imposed by the mounting method and the characteristics of the X-ray beam used to make the measurement (for example, the beam divergence, δθ, and the precision with which the X-ray energy is selected, Δλ/λ, etc.), often known as 'instrumental broadening' or 'apparatus function'. The Darwin Width can be determined from simulation using fundamental physics and the fundamental properties of the crystal. The 'instrumental broadening' or 'apparatus function' may be determined by experimentation. Careful mounting of samples is required in order to avoid imposing elastic strain.

For a perfect diamond single crystal, the theoretical rocking curve Full Width at Half Maximum (FWHM) for the {400} plane at typical X-ray wavelengths used for diffraction studies is ~1 arc second. For a real single crystal (that is a crystal that is not perfect), the rocking curve is broadened by the presence of crystallographic defects. For a single crystal grown by tiling or heteroepitaxial growth methods, the FWHM for the {400} plane is typically over 25 arc seconds.

Figure 7A:
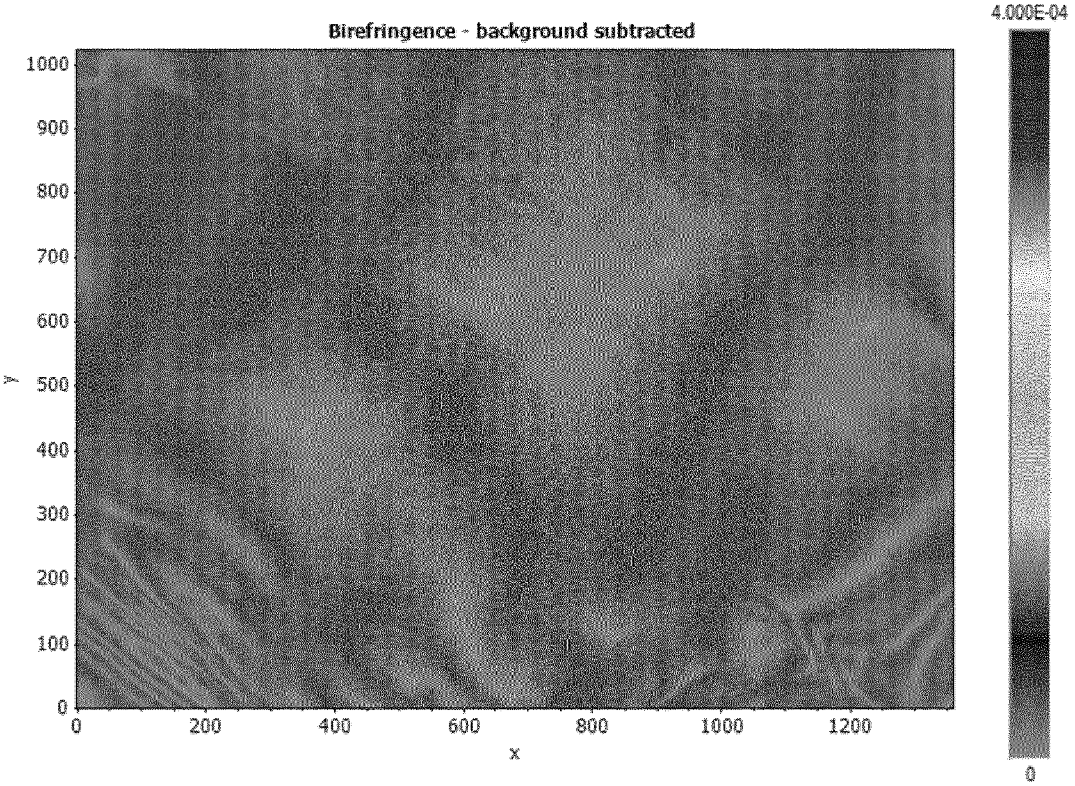
FIG. 7 shows birefringence plots for three samples grown using different techniques; a) homoepitaxial growth on a single crystal diamond substrate; b) heteroepitaxial growth on a non-diamond substrate; and c) homoepitaxial growth on a tiled SC diamond substrate.
Figure 7B:
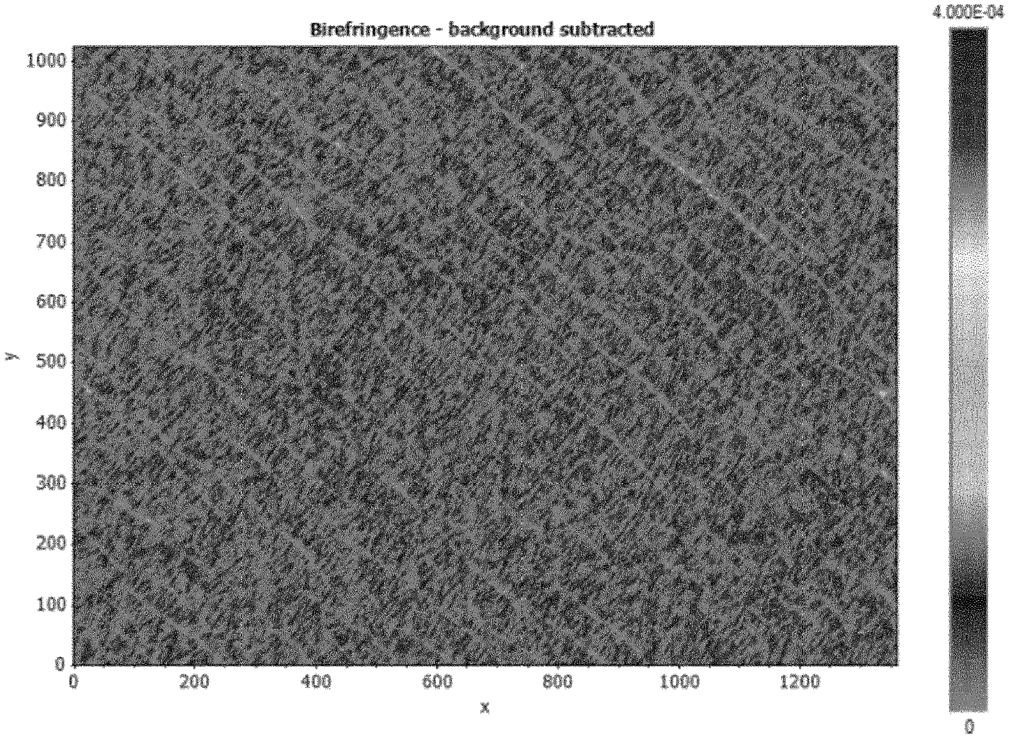
Figure 7C:
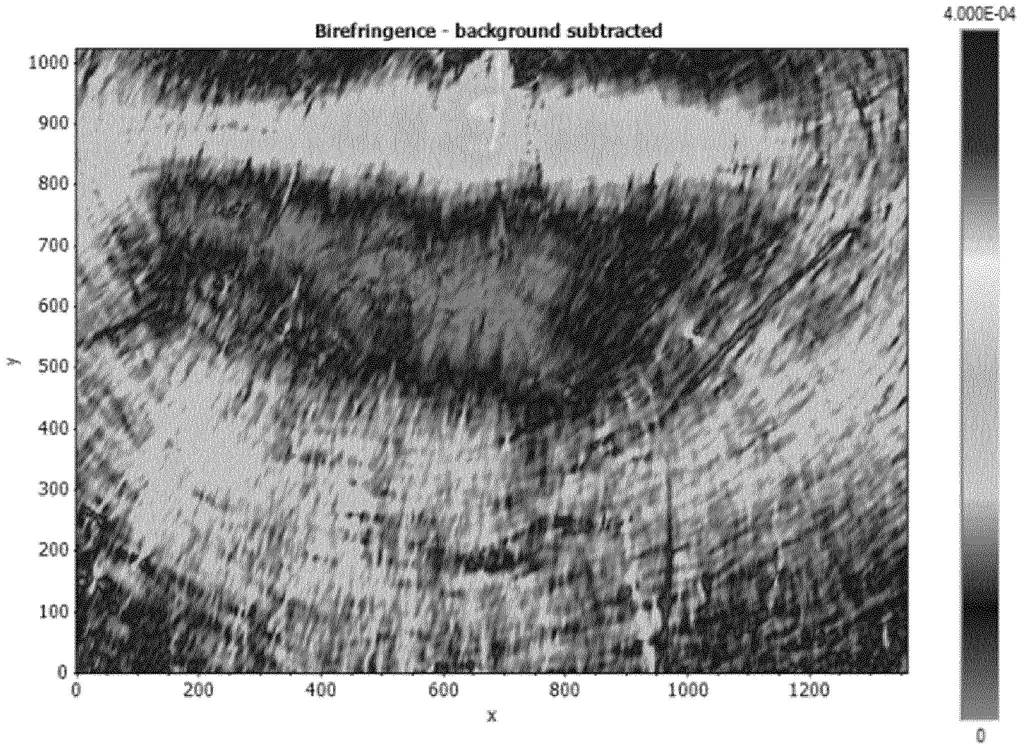

Turning now to birefringence, this can be measured qualitatively on a parallel-sided plate of diamond using cross-polarised microscopy; under transmitted light conditions, with crossed polarising filters installed behind and in front of the sample. The Metripol™ system is routinely used to give a quantitative measure of sin(δ), the absolute measure of rotation of transmitted light. Birefringence can be calculated from sin(δ) by considering the thickness of the sample. Metripol™ is sufficiently powerful to measure values of birefringence as low as $\Delta n=10^{-8}$. FIG. 7 shows birefringence plots for three samples produced using three different synthesis techniques. FIG. 7*a* shows a birefringence plot for a diamond grown homoepitaxially on a single crystal diamond substrate. FIG. 7*b* shows a birefringence plot for a single crystal diamond grown heteroepitaxially on non-diamond substrate. FIG. 7*c* shows a birefringence plot for diamond grown homoepitaxially on a tiled array of single crystal diamond substrates.

The table shows the highest and average value of birefringence within the three plots

TABLE 1

Birefringence values for samples of FIGS. 7a, 7b and 7c

| Growth | Highest value |
|---|---|
| 7a Homoepitaxial | $4.3 \times 10^{-5}$ |
| 7b Heteroepitaxial | $2.1 \times 10^{-4}$ |
| 7c Tiled | $2.7 \times 10^{-4}$ |

FIG. 7. Birefringence plots for three samples grown using different techniques. a) Homoepitaxial growth on a single crystal diamond substrate b) Heteroepitaxial growth on a non-diamond substrate c) Homoepitaxial growth on a tiled SC diamond substrate d) The table shows the highest and average value of birefringence within the three plots All three samples have been synthesised with a microwave plasma-assisted chemical vapour deposition reactor. Sample a) was produced from homoepitaxial layer growth on a <100> orientated diamond surface that has been prepared using high quality polishing techniques to minimise Ra (less than 20 nm) and therefore reduce the nucleation of dislocation in the epitaxial layer.

The birefringence plots in FIG. 7 show strain patterns that would be expected due to the three different growth methods. Sample a) has low birefringence, as it has been grown homoepitaxially. Sample b) has relatively high birefringence across the sample caused by the difference in lattice parameter between the diamond and the non-diamond substrate, which introduces a high dislocation density. Sample c) has areas of high birefringence likely to be caused by growth over the boundaries between the tiled substrates, and areas of low birefringence that is likely to be caused by growth over the single crystal substrates (not above the boundaries).

The effect of strain and birefringence on the suitability of diamond for multi-spectral imaging is likely to depend on the wavebands that are being used for the particular application with polycrystalline diamond lenses being sufficient for the majority of IR and longer wavelength applications. Polycrystalline diamond was thought to be likely to produce too much scatter for wavebands in the visible space due to its higher roughness. Although sample a) has the most optimum optical properties, the size is currently limited to 8×8 mm. It is proposed that sample c) has the potential to be used for visible wavelength applications using the regions of low birefringence and to access larger aperture sizes. As development continues into large-area optical grade single crystal, lower birefringence parts will be available to optimise single crystal lenses.

Figure 8:
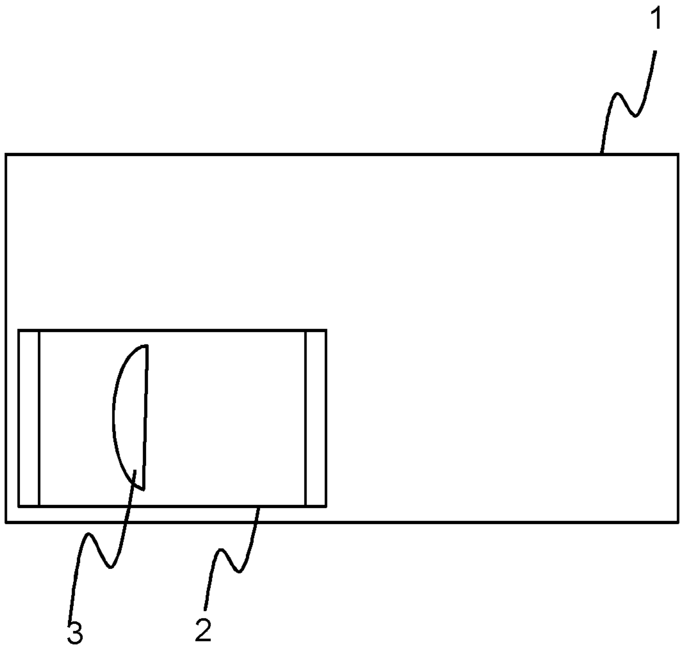
FIG. 8 illustrates schematically in a block diagram shows an exemplary multispectral image system.

FIG. 8 herein illustrates schematically in a block diagram an exemplary multispectral imaging system 1. The multispectral imaging system includes a component 2 for imaging. The component 2 includes a diamond lens 3 as described herein.

Surprisingly, the inventors have found that even synthetic diamond with poor optical properties such as high birefringence can be used for multispectral imaging. By way of explanation of birefringence, for an isotropic medium, such as stress-free diamond, the refractive index is independent of the direction of the polarization of light. If a diamond sample is inhomogeneously stressed, either because of grown-in stress or local defects or because of externally applied pressure, the refractive index is anisotropic. The variation of the refractive index with direction of polarization may be represented by a surface called the optical indicatrix that has the general form of an ellipsoid. The difference between any two ellipsoid axes is the linear birefringence for light directed along the third. This may be expressed as a function involving the refractive index of the unstressed material, the stress and opto-elastic coefficients.

The Metropol™ gives information on how the refractive index at a given wavelength depends on polarization direction in the plane perpendicular to the viewing direction. An explanation of how the Metropol works is given by A. M. Glazer et al. in Proc. R. Soc. Lond. A (1996) 452, 2751-2765.

From a series of images captured for a range of different relative orientations of a pair of plane polarising filters a determination of the direction of the "slow axis" is made, the polarization direction in the plane perpendicular to the viewing direction for which the refractive index is a maximum. |sin δ| is also measured, where δ is the phase shift given by $$\delta = (2\pi/\lambda)\Delta nL \quad \text{(Eq. 4)}$$

where λ is the wavelength of the light, L is the thickness of the specimen and Δn is the difference between the refractive index for light polarized parallel to the slow and fast axes. An L is known as the 'optical retardation'.

For retardation in first order, with L=0.6 mm and λ=589.6 nm, then:

when sin δ=1 and Δn L=λ/4, it can be deduced that $\Delta n=2.45\times10^{-4}$.

when sin δ=0.5 and Δn L=λ/12, it can be deduced that $\Delta n=0.819\times10^{-4}$.

The behaviour of sin δ is the property of a particular plate of material and dependent upon thickness. A more fundamental property of the material can be obtained by converting the sine δ information back to a value averaged over the thickness of the sample of the difference between the refractive index for light polarised parallel to the slow and fast axes, $\Delta n_{[average]}$.

Even diamond material with a high birefringence, such as single crystal CVD diamond material grown by heteroepitaxial growth or by tiling on multiple substrates, or well-polished polycrystalline CVD diamond material can be used in multispectral imaging. Whereas good quality optical single crystal diamond can have birefringence values as low as $1\times10^{-7}$, it has been found that many multispectral imaging applications can tolerate diamond lenses with birefringence values of $1\times10^{-4}$ and above. This allows larger area single crystal diamond material, with a largest linear dimension (typically diameter for a lens that is circular in plan view) to be used than was previously thought possible.

The diamond lens 3 of FIG. 8 has a birefringence value Δn of greater than $1\times10^{-4}$, when measured over a specified area of at least 4 mm by 4 mm through a sample thickness of at least 400 μm, and a largest linear dimension of at least 10 mm.

In the example of FIG. 8, the diamond lens 3 is formed from polycrystalline CVD diamond and typically has at least one curved surface, which can be polished to a surface roughness Ra of no more than 50 nm. Where the opposite surface is a flat surface, this can be polished to a surface roughness of no more than 10 nm.

It may also be desirable to apply a surface coating or pattern to at least one of the surfaces, for example as an anti-reflective coating.

Diamond lenses in multispectral imaging applicants can also have relatively high values of forward scatter. This property is described in Dodson et. al., Window and Dome Technologies and Materials XII, Proc. of SPIE, Vol. 8016, 80160L 2011. Scatter values measured using integrating spheres and numerical analysis of reflectometry data has been measured to be around 2.5% for polycrystalline CVD diamond material, and less than 0.7% for homoepitaxial single crystal, with a scatter angle of greater than 2.5° and a wavelength of 1064 nm.

Critical properties including refractive index response (to temperature and wavelength), Abbe number and thermal expansion coefficient have been compared to other optical materials and this has demonstrated that diamond is a leading material to produce a low mass solution able to withstand harsh environments with good optical performance, even with 'poor' optical properties such as high birefringence compared to optical grades of single crystal material. Due to diamond's hardness, consideration has to be given to the processing of a curved surface into the part, and solutions have been shown. It is believed that some multispectral applications may benefit from using single crystal diamond rather than polycrystalline diamond and for this to be possible, large-area single crystal diamond is required. The potential advantages and disadvantages of heteroepitaxial growth and tiled growth have been considered as routes to producing these large-area single crystal diamond samples.

While this invention has been particularly shown and described with reference to preferred embodiments, it will be understood to those skilled in the art that various changes in form and detail may be made without departing from the scope of the invention as defined by the appendant claims.

The invention claimed is:

1. A multispectral imaging system comprising: a diamond lens configured for the multispectral imaging system, the diamond lens having a largest linear dimension of at least 10 mm and formed from diamond material having a birefringence Δn of greater than $1\times10^{-4}$, measured over a specified area of at least 4 mm by 4 mm through a maximum thickness of at least 400 μm;

wherein the diamond lens consists of single crystal diamond material; and wherein the diamond material has a FWHM X-ray rocking curve width for the (004) reflection of greater than 20 arc seconds.

2. The multispectral imaging system according to claim 1, wherein single crystal diamond material is obtained by one of a tiling growth method and a heteroepitaxial growth method.

3. The multispectral imaging system according to claim 1, wherein the diamond lens has at least one curved surface, the curved surface having a surface roughness Ra selected from any of no more than 3 nm, no more than 5 nm, no more than 10 nm, and no more than 20 nm.

4. The multispectral imaging system according to claim 1, wherein the diamond lens has at least one substantially flat surface, the flat surface having a surface roughness Ra selected from any of no more than 3 nm, no more than 5 nm, no more than 10 nm, and no more than 20 nm.

5. The multispectral imaging system according to claim 1, further comprising any of a surface coating and a surface structure to deliver improved optical properties.

6. The multispectral imaging system according to claim 1, wherein a forward scatter of the diamond lens at a wavelength of 1.064 μm, integrated over a solid angle from 2.5° to 30° from a transmitted beam, is between 0.5% and 3%.

7. The multispectral imaging system according to claim 1, wherein the absorption coefficient of the diamond material at a wavelength of 1.064 μm is greater than 0.01 $cm^{-1}$.

8. The multispectral imaging system according to claim 1, wherein the diamond lens is substantially partially spherical or partially ellipsoidal in shape.

9. The multispectral imaging system according to claim 1, wherein the diamond lens is a Fresnel lens.

* * * * *